(12) United States Patent
Asano

(10) Patent No.: US 11,868,544 B2
(45) Date of Patent: Jan. 9, 2024

(54) INFORMATION PROCESSING DEVICE, INFORMATION PROCESSING METHOD, PROGRAM, DISPLAY SYSTEM, DISPLAY METHOD, AND ELECTRONIC WRITING TOOL

(71) Applicant: Sharp NEC Display Solutions, Ltd., Tokyo (JP)

(72) Inventor: Takahiro Asano, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/527,860

(22) Filed: Nov. 16, 2021

(65) Prior Publication Data

US 2022/0091682 A1 Mar. 24, 2022

Related U.S. Application Data

(63) Continuation of application No. PCT/JP2019/023625, filed on Jun. 14, 2019.

(51) Int. Cl.
*G06F 3/03* (2006.01)
*G06F 3/0354* (2013.01)

(52) U.S. Cl.
CPC ........ *G06F 3/0325* (2013.01); *G06F 3/03542* (2013.01); *G06F 3/03545* (2013.01)

(58) Field of Classification Search
CPC .... G06F 3/03545; G06F 3/046; G06F 3/0325; G06F 3/03542; G06F 3/04883;
(Continued)

(56) References Cited

U.S. PATENT DOCUMENTS 11,150,768 B2 * 10/2021 Shiohara .............. H04N 9/3185
2011/0279248 A1 11/2011 Ogawa
(Continued)

FOREIGN PATENT DOCUMENTS

JP 2011-239319 A 11/2011
JP 2016-170462 A 9/2016
(Continued)

OTHER PUBLICATIONS

Japanese Office Action, dated Jul. 5, 2022, in Japanese Application No. 2021-525532and English Translation thereof.
(Continued)

*Primary Examiner* — Matthew A Eason
*Assistant Examiner* — Scott D Au
(74) *Attorney, Agent, or Firm* — MCGINN I.P. LAW GROUP, PLLC

(57) ABSTRACT

An information processing device includes an acquisition unit and an association unit. The acquisition unit is configured to acquire first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool. The association unit is configured to associate the plurality of electronic writing tools with positions of the plurality of electronic writing tools on the display image, respectively, using the first information and the second information.

16 Claims, 10 Drawing Sheets

(58) Field of Classification Search
CPC .. G06F 3/04162; G06F 3/0488; G06F 3/0412; G06F 3/0383
See application file for complete search history.

(56) References Cited

U.S. PATENT DOCUMENTS

2018/0059806 A1* 3/2018 Mori .................. G06F 3/041
2018/0275819 A1* 9/2018 Oshima ............... G06F 3/0421

FOREIGN PATENT DOCUMENTS

| JP | 2017-117434 A | 6/2017 |
| JP | 2018-013873 A | 1/2018 |
| JP | 2018-132799 A | 8/2018 |
| JP | 2018-526734 A | 9/2018 |
| JP | 2018-156466 A | 10/2018 |
| WO | WO 2017/017812 A1 | 2/2017 |
| WO | WO 2017/044975 A1 | 3/2017 |

OTHER PUBLICATIONS

International Search Report (ISR) (PCT Form PCT/ISA/210), in PCT/JP2019/023625, dated Aug. 27, 2019.
Chinese Office Action, dated Aug. 12, 2023, in Chinese Application No. 201980097309.8 and English Translation thereof.

* cited by examiner

INFORMATION PROCESSING DEVICE, INFORMATION PROCESSING METHOD, PROGRAM, DISPLAY SYSTEM, DISPLAY METHOD, AND ELECTRONIC WRITING TOOL

TECHNICAL FIELD

The present invention relates to an information processing device, an information processing method, a program, a display system, a display method, and an electronic writing tool.

BACKGROUND ART

In recent years, display systems in which users can draw objects (for example, text, figures, or signs) with electronic writing tools on display images projected from projectors or displayed by displays have been developed.

Patent Literatures 1 and 2 disclose examples of display systems. In the display systems, objects are drawn on display images with electronic writing tools. An electronic writing tool includes a light-emitting unit. Light emitted from the light-emitting unit of the electronic writing tool is captured by a camera. The electronic writing tool can be detected with the light.

CITATION LIST

Patent Literature

[Patent Literature 1]
Japanese Unexamined Patent Application, First Publication No. 2011-239319
[Patent Literature 2]
Japanese Unexamined Patent Application, First Publication No. 2018-156466

SUMMARY OF INVENTION

Technical Issues

When a plurality of electronic writing tools are located on one display image and, for example, the properties which can be detected by a camera (for example, wavelengths of light emitted from light-emitting units of the electronic writing tools) are the same, for example, the positions at which the plurality of electronic writing tools are located on the display image may not be able to be identified, despite the plurality of electronic writing tools being able to be detected by the camera.

An exemplary objective of the present invention is to accurately identify positions at which a plurality of electronic writing tools are located on a display image. Other objectives of the present invention are apparent from the description of the present specification.

Solution to Problem

According to an aspect of the present invention, an information processing device includes: acquisition unit for acquiring first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool; and association unit for associating the plurality of electronic writing tools with positions of the plurality of electronic writing tools on the display image, respectively, using the first information and the second information.

According to another aspect of the present invention, an information processing method includes: acquiring first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool; and associating the plurality of electronic writing tools with positions of the plurality of electronic writing tools on the display image, respectively, using the first information and the second information.

According to still another aspect of the present invention, a program causes a computer to have functions of: acquiring first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool; and associating the plurality of electronic writing tools with positions of the plurality of electronic writing tools on the display image, respectively, using the first information and the second information.

According to still another aspect of the present invention, a display system includes: a display device; a plurality of electronic writing tools used to draw a plurality of objects on a display image displayed by the display device; and an information processing device. The information processing device includes acquisition unit for acquiring first information which is generated by processing a detection result output from a first sensor provided outside of a plurality of electronic writing tools and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool, and association unit for associating the plurality of electronic writing tools with positions of the plurality of electronic writing tools on the display image, respectively, using the first information and the second information.

According to still another aspect of the present invention, a display method includes: detecting relative positions of the other electronic writing tools relative to the plurality of electronic writing tools, respectively, by sensors provided in the plurality of electronic writing tools; and displaying objects associated with the plurality of electronic writing tools on a display screen in aspects in accordance with the plurality of electronic writing tools, respectively, using information regarding the relative positions of the other electronic writing tools relative to each of the plurality of electronic writing tools.

According to still another aspect of the present invention, an electronic writing tool includes: a light-emitting unit configured to emit light in writing of an object on a display image; and a sensor configured to detect other electronic writing tools in the writing of the object on the display image.

Advantageous Effects of Invention

According to an aspect of the present invention, it is possible to accurately identify positions at which a plurality of electronic writing tools are located on a display image.

BRIEF DESCRIPTION OF DRAWINGS

The above-described objectives and other objectives, features, and advantages will be more apparent from preferred embodiments to be described below and the appended following drawings.

DESCRIPTION OF EMBODIMENTS

Figure 1:
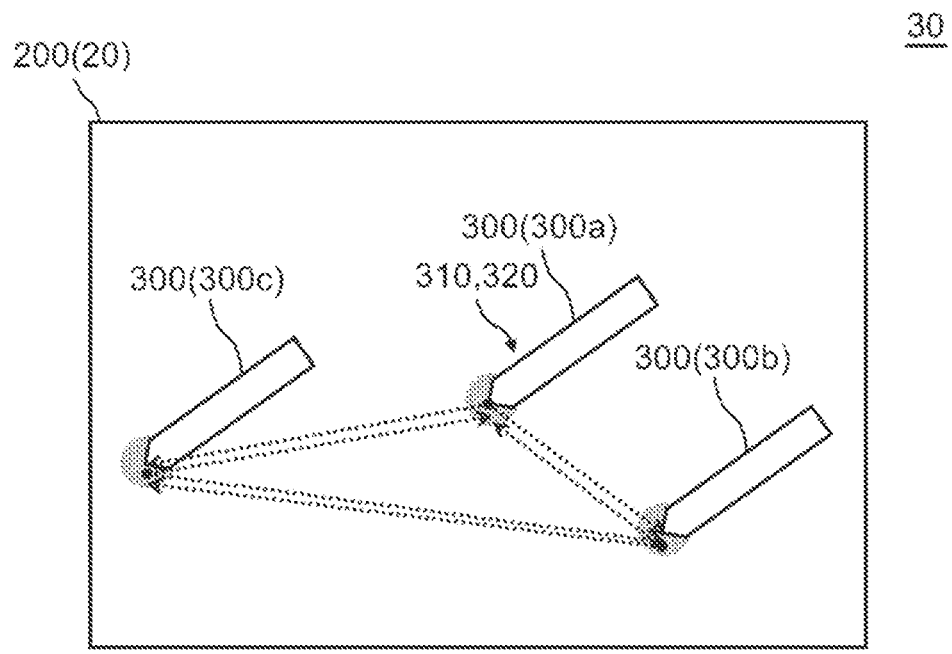
FIG. 1 is a diagram illustrating a display system according to a first embodiment.
Figure 1:
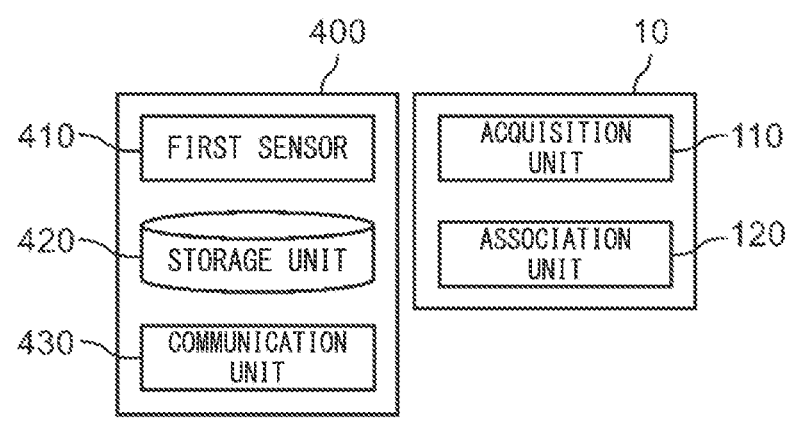

Hereinafter, embodiments of the present invention will be described with reference to the drawings. In all the drawings, similar reference numerals are given to similar constituent elements and description thereof will be omitted appropriately.

First Embodiment

Figure 2:
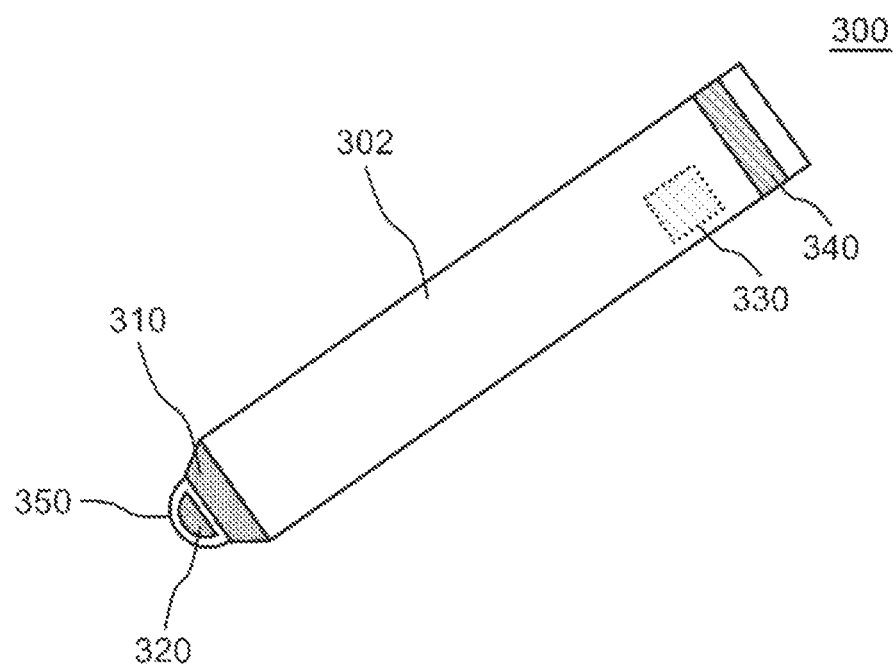
FIG. 2 is a diagram illustrating an example of an electronic writing tool used for the display system illustrated in FIG. 1.
Figure 3A:
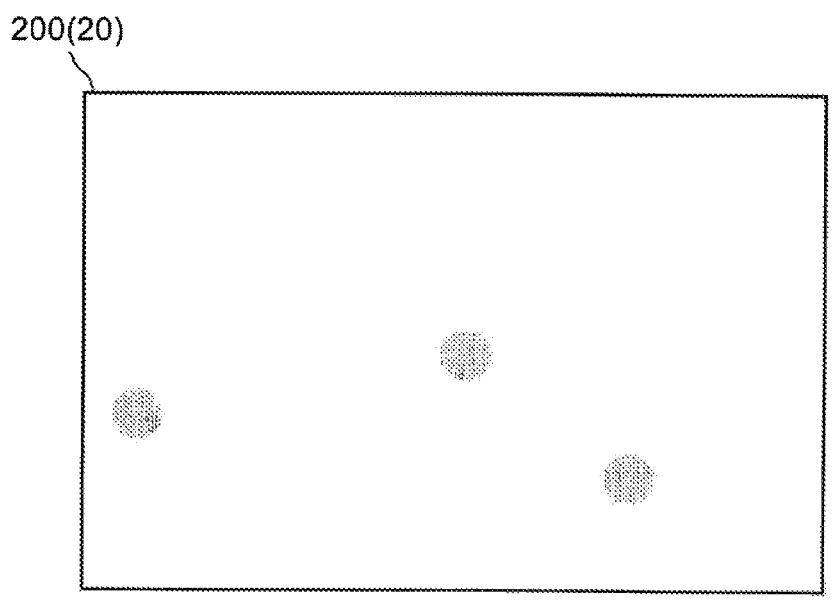
FIG. 3A is a diagram illustrating examples of detection positions of a plurality of electronic writing tools on a display image.
Figure 3B:
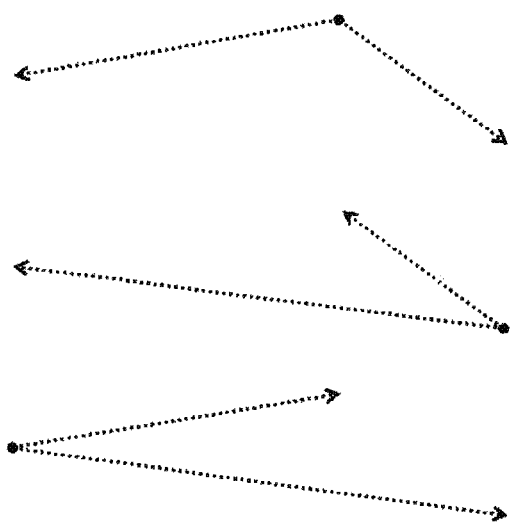
FIG. 3B is a diagram illustrating examples of relative positions of the other electronic writing tools relative to each electronic writing tool.

FIG. 1 is a diagram illustrating a display system 30 according to a first embodiment. FIG. 2 is a diagram illustrating an example of an electronic writing tool 300 used for the display system 30 illustrated in FIG. 1. FIG. 3A is a diagram illustrating examples of detection positions of a plurality of electronic writing tools 300 on a display image 200. In particular, circles displayed by hatching in FIG. 3A indicate positions at which the plurality of electronic writing tools 300 are detected. FIG. 3B is a diagram illustrating examples of relative positions of the other electronic writing tools 300 relative to each electronic writing tool 300. In particular, the upper stage of FIG. 3B indicates relative positions (the tip ends of arrows in the drawing) of the electronic writing tools 300b and 300c relative to the electronic writing tool 300a (a black circle in the drawing). The intermediate stage of FIG. 3B indicates relative positions (the tip ends of arrows in the drawing) of the electronic writing tools 300a and 300c relative to the electronic writing tool 300b (a black circle in the drawing). The lower stage of FIG. 3B indicates relative positions (the tip ends of arrows in the drawing) of the electronic writing tools 300a and 300c relative to the electronic writing tool 300c (a black circle in the drawing).

The display system 30 includes an information processing device 10, a display device 20, the plurality of electronic writing tools 300, and a sensor device 400. The display device 20 displays the display image 200.

An overview of the information processing device 10 will be described with reference to FIG. 1. The information processing device 10 includes an acquisition unit 110 and an association unit 120. The acquisition unit 110 acquires first information and second information. The first information includes positions at which the plurality of electronic writing tools 300 are detected on the display image 200. The first information is generated by processing a detection result output from the first sensor 410. The first sensor 410 is provided outside of the plurality of electronic writing tools 300. The plurality of electronic writing tools 300 are respectively used to draw a plurality of objects on the display image 200. The second information includes the relative positions of the other electronic writing tools 300 relative to each electronic writing tool 300. The second information is generated by processing detection results output from the plurality of second sensors 320. The plurality of second sensors 320 are respectively provided in the plurality of electronic writing tools 300. The association unit 120 associates the plurality of electronic writing tools 300 with the positions of the plurality of electronic writing tools 300 on the display image 200, respectively, using the first information and second information.

According to the embodiment, it is possible to accurately identify positions at which a plurality of electronic writing tools 300 are located on the display image 200. Specifically, in the embodiment, the association unit 120 associates the plurality of electronic writing tools 300 with the positions of the plurality of electronic writing tools 300 on the display image 200, respectively, using not only the positions at which the plurality of electronic writing tools 300 are detected on the display image 200 (for example, see FIG. 3A) but also the relative positions of the other electronic writing tools 300 relative to each electronic writing tool 300 (for example, see FIG. 3B). For example, as illustrated in FIG. 3A, for example, when properties of the electronic writing tools 300 which can be detected by the first sensor 410 (for example, a wavelength of light emitted from the first sensor 410) are the same despite obtaining of information regarding the detection positions of the plurality of electronic writing tools 300 by the first sensor 410, it cannot be identified which electronic writing tool located at each detection position is one of the electronic writing tools 300a, 300b, and 300c. However, for example, as illustrated in FIG. 3B, by the second sensor 320 detecting relative positions of the other electronic writing tools 300 relative to each electronic writing tool 300, it is possible to identify which electronic writing tool located at each detection position is one of the electronic writing tools 300a, 300b, and 300c.

Further, according to the embodiment, the following display method is realized. That is, relative positions of the other electronic writing tools 300 relative to each of the plurality of electronic writing tools 300 are detected by the second sensor 320 provided in each of the plurality of electronic writing tools 300. Subsequently, using information regarding the relative positions of the other electronic writing tools 300 relative to each of the plurality of electronic writing tools 300, an object associated with each of the plurality of electronic writing tools 300 is displayed on the display image 200 in an aspect in accordance with each of the plurality of electronic writing tools 300. As described above, in the embodiment, it is possible to accurately identify positions at which the plurality of electronic writing tools 300 are located on the display image 200. Accordingly, it is possible to cause aspects of the plurality of objects to accurately correspond to the plurality of electronic writing tools 300, respectively.

In the embodiment, the first sensor 410 can detect light emitted from the light-emitting unit 310 of each of the plurality of electronic writing tools 300. In this case, the first information (the position of each of the plurality of electronic writing tools 300 on the display image 200) is generated by processing a detection result of the light emitted from the light-emitting unit 310. Further, the light generated from the light-emitting unit 310 may be detected from an image including the display image 200 on which the plurality of objects are drawn.

The first sensor 410 may detect a touch or an approach of each of the plurality of electronic writing tools 300 to the display image 200 instead of the light. In this case, the first information (the position of each of the plurality of electronic writing tools 300 on the display image 200) is generated by processing a detection result of the position at which the electronic writing tool 300 is touched or approached to the display image 200. In this example, the display image 200 can be set as, for example, a touch screen and the first sensor 410 can be set as, for example, a tactile sensor, a pressure sensor, or a proximity sensor provided on the touch screen.

The plurality of objects are overlapped and displayed on the display image 200 based on a plurality of trajectories along which the plurality of electronic writing tools 300 are traced. For example, by using the detection results of the first sensor 410, it is possible to identify the trajectories along which the electronic writing tools 300 are traced.

The acquisition unit 110 may acquire the first information via one interface (for example, one of wired and wireless interfaces) and acquire the second information via another interface (for example, the other of wired and wireless interfaces) different from the one interface. Alternatively, the acquisition unit 110 may acquire both the first information and the second information via a common interface (for example, one of wired and wireless interfaces).

The details of the display system 30 will be described with reference to FIGS. 1 to 3.

As one example, the display device 20 is a projector. In this example, the display image 200 may be an image projected to a projection surface (for example, a screen or a wall) by the projector (the display device 20). As another example, the display device 20 is a display. In this example, the display image 200 may be an image displayed on a display surface by the display (the display device 20). The display image 200 is realized by, for example, an electronic blackboard.

On the display image 200, each of a plurality of objects is drawn with one of the plurality of electronic writing tools 300. In the example illustrated in FIG. 1, three different objects are drawn with the electronic writing tools 300a, 300b, and 300c.

The electronic writing tool 300 includes a supporter 302, the light-emitting unit 310, a second sensor 320, a storage unit 330, a communication unit 340, and a push switch 350.

The supporter 302 has a tip end and a rear end and extends in one direction from the tip end to the rear end. The light-emitting unit 310, the second sensor 320, the storage unit 330, the communication unit 340, and the push switch 350 are attached to the supporter 302 and are integrated via the supporter 302.

The light-emitting unit 310 emits light in the writing of the object on the display image 200. The light emitted from the light-emitting unit 310 can be, for example, infrared light or visible light. When the light-emitting unit 310 emits infrared light, the light emitted from the light-emitting unit 310 can be set to be not able to be recognized by human sight. When the electronic writing tool 300 is moved in the writing of the object, the light emitted from the light-emitting unit 310 is also moved to form a trajectory of the light. The light-emitting unit 310 is located on the tip end side of the supporter 302. Accordingly, the light-emitting unit 310 can be made to approach the object. Therefore, the trajectory of the light emitted from the light-emitting unit 310 can substantially follow the shape of the object.

The second sensor 320 detects the relative positions of the other electronic writing tools 300 relative to the electronic writing tool 300 in which the second sensor 320 is provided. The second sensor 320 can be set as a sensor capable of detecting the other electronic writing tools 300 and includes, for example, at least one of an optical sensor and an ultrasonic sensor.

The second information is generated by processing a detection result output from the second sensor 320. A location at which the detection result of the second sensor 320 is processed is not particularly limited. For example, the process of the detection result by the second sensor 320 may be performed inside the information processing device 10 (for example, the acquisition unit 110), may be performed inside the electronic writing tool 300, or may be performed outside of the information processing device 10 and the electronic writing tool 300 (for example, an external network).

The storage unit 330 stores data (the second information) obtained by processing the detection result of the second sensor 320. The storage unit 330 may further store identification information of the electronic writing tool 300 (for example, a line color or a line shape of the object drawn with the electronic writing tool 300) in advance.

The communication unit 340 transmits and receives signals to and from external devices (for example, the information processing device 10 and the sensor device 400) of the electronic writing tool 300. The communication unit 340 can transmit the second information stored in the storage unit 330 to the information processing device 10.

The push switch 350 can be set to be pushed against the display image 200. The push switch 350 includes at least one selected from a group formed by, for example, a pressure sensor and a tactile sensor. While the push switch 350 is pushed by pushing the push switch 350 against the display image 200, the light-emitting unit 310 may emit light, the second sensor 320 may detect the other electronic writing tools 300, and the storage unit 330 may store data detected by the second sensor 320. In this way, the second sensor 320 can detect the other electronic writing tools 300 from the time at which the electronic writing tool 300 is pushed against the display image 200 until the electronic writing tool 300 is moved away from the display image 200. The second sensor 320 may not detect the other electronic writing tools 300 while the electronic writing tool 300 is not pushed against the display image 200 (while the push switch 350 is not pushed).

The sensor device 400 includes a first sensor 410, a storage unit 420, and a communication unit 430.

The first sensor 410 detects the light emitted from the light-emitting unit 310 of the electronic writing tool 300. Thus, the first sensor 410 can detect the light (the first information) emitted from the light-emitting unit 310 of the electronic writing tool 300.

The first sensor 410 includes, for example, an imaging unit and an image processing unit. In this example, the light (the first information) emitted from the light-emitting unit 310 of the electronic writing tool 300 is generated by processing an image generated by the first sensor 410. The image generated by the imaging unit is, for example, a moving image and includes a plurality of frame images. The image processing unit processes the frame images to generate the first information. The image processing unit is realized, for example, by installing image processing software in a computer device that includes a CPU and a memory. The image processing unit may be a microcomputer. The image processing unit may be provided to be integrated with the imaging unit (for example, in the same casing) or may be provided to be separate from the imaging unit. The image processing unit may be included in the information processing device 10.

The first information is generated by processing a detection result output from the first sensor 410. A location at which the detection result of the first sensor 410 is processed is not particularly limited. For example, the process of the detection result by the first sensor 410 may be performed inside the information processing device 10 (for example, the acquisition unit 110), or may be performed outside of the information processing device 10 (for example, an external network).

The storage unit 420 stores data (the first information) obtained by processing the detection result of the first sensor 410.

The communication unit 430 transmits and receives signals to and from external devices (for example, the information processing device 10 and the electronic writing tool 300) of the sensor device 400. The communication unit 430 can transmit the first information stored in the storage unit 420 to the information processing device 10.

The first sensor 410 may detect the plurality of electronic writing tools 300 on the display image 200 from the time at which the electronic writing tool 300 is pushed against the display image 200 until the electronic writing tool 300 is moved away from the display image 200. For example, when the push switch 350 of the electronic writing tool 300 is pushed against the display image 200 and the push switch 350 is pushed, the communication unit 340 of the electronic writing tool 300 transmits a signal to the communication unit 430. In this case, while the push switch 350 is pushed, the first sensor 410 may detect the light from the light-emitting unit 310 of the electronic writing tool 300 and the storage unit 420 may store data detected by the first sensor 410. The first sensor 410 may not detect the electronic writing tool 300 while the electronic writing tool 300 is not pushed against the display image 200.

The acquisition unit 110 acquires the first information transmitted from the sensor device 400 (the first sensor 410) and acquires the second information transmitted from the electronic writing tool 300 (the second sensor 320). The first information may be transmitted directly from the sensor device 400 (the first sensor 410) to the acquisition unit 110 or may be transmitted to the acquisition unit 110 via a device different from the sensor device 400 (the first sensor 410). The second information may be transmitted directly from the electronic writing tool 300 (the second sensor 320) to the acquisition unit 110 or may be transmitted to the acquisition unit 110 via a device different from the electronic writing tool 300 (the second sensor 320).

Figure 4:
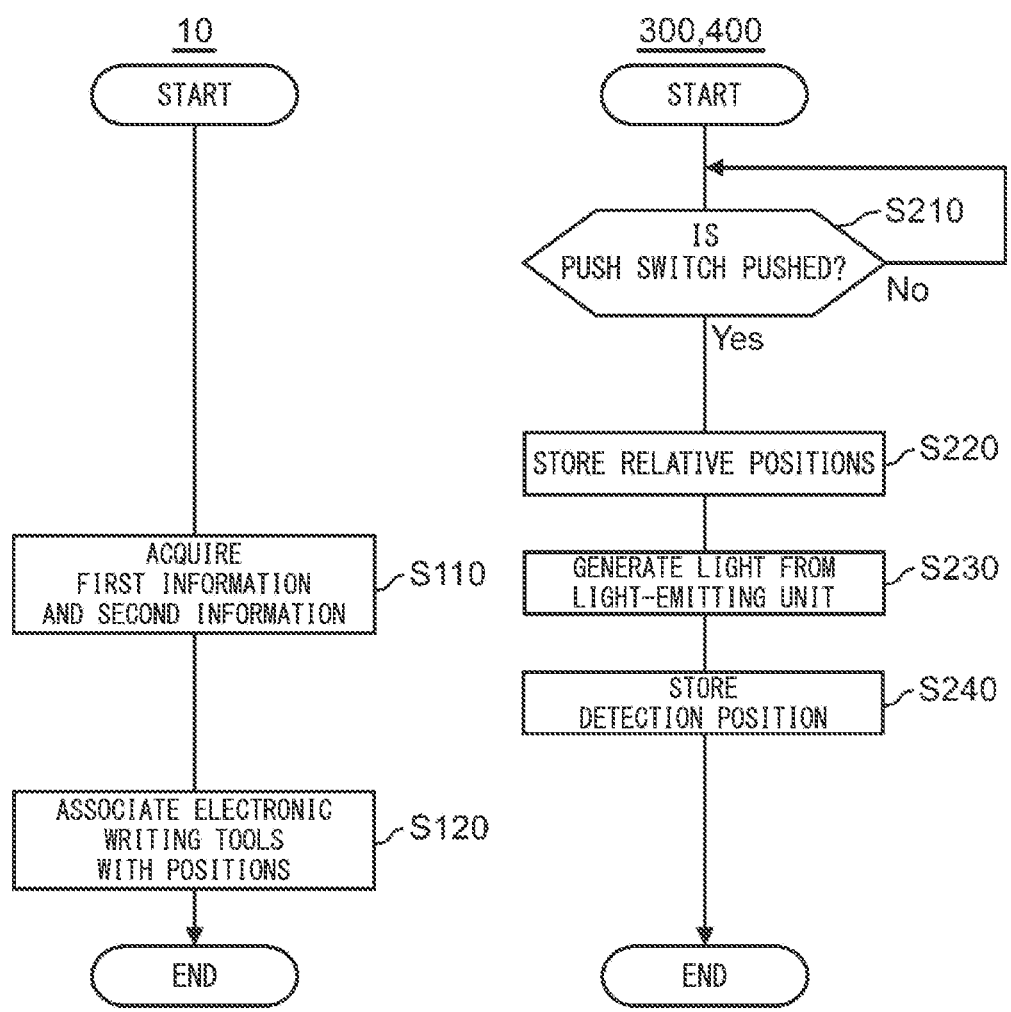
FIG. 4 is a flowchart illustrating an example of an operation of each of an information processing device, the plurality of electronic writing tools, and a sensor device illustrated in FIG. 1.

FIG. 4 is a flowchart illustrating an example of an operation of each of the information processing device 10, the plurality of electronic writing tools 300, and the sensor device 400 illustrated in FIG. 1.

First, each electronic writing tool 300 detects whether the push switch 350 is pushed (No in step S210) until the push switch 350 is pushed against the display image 200 and the push switch 350 is pushed (No in step S210). When each electronic writing tool 300 detects that the push switch 350 is pushed (Yes in step S210), each electronic writing tool 300 causes the second sensor 320 to detect the other electronic writing tools 300 and causes the storage unit 330 to store the relative positions (the second information) generated by processing the detection result of the second sensor 320 (step S220). Further, each electronic writing tool 300 emits the light from the light-emitting unit 310 (step S230). The sensor device 400 causes the first sensor 410 to detect that the light-emitting unit 310 of each electronic writing tool 300 emits the light and causes the storage unit 420 to store the detection position (the first information) generated by processing the detection result of the first sensor 410 (step S240).

The acquisition unit 110 of the information processing device 10 acquires the first information and the second information (step S110). The acquisition unit 110 may acquire the first information and the second information when the plurality of electronic writing tools 300 are pushed against the display image 200 (Yes in step S210). The acquisition unit 110 may acquire the first information and the second information at different timings or acquire the first information and the second information at the same timing. For example, the acquisition unit 110 may acquire the first information after step S220 is performed and before steps S230 and S240 are performed or may acquire the second information after steps S220, S230, and S240 are performed. Alternatively, the acquisition unit 110 may acquire both the first information and the second information at the same timing after steps S220, S230, and S240 are performed.

Subsequently, the association unit 120 of the information processing device 10 associates the plurality of electronic writing tools 300 with the positions of the plurality of electronic writing tools 300 on the display image 200, respectively, using the first information and the second information (step S120).

In the example illustrated in FIG. 4, steps S220, S230, and S240 are performed based on whether the push switch 350 of the electronic writing tool 300 is pushed (step S210). However, steps S220, S230, and S240 may be performed based on whether the electronic writing tool 300 is touched or approached to the display image 200 in accordance with another method other than the push switch 350.

Second Embodiment

Figure 5:
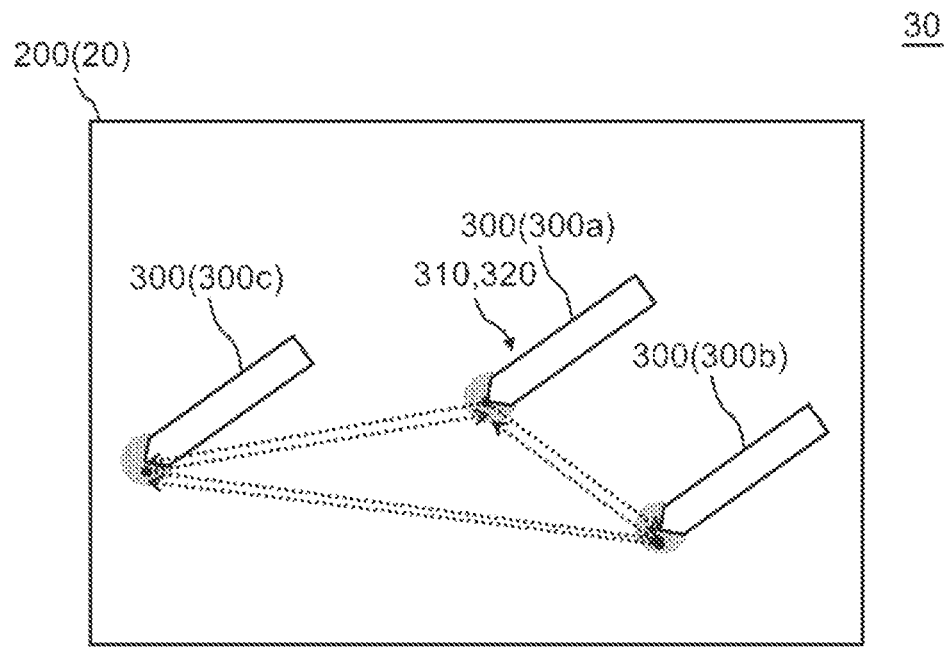
FIG. 5 is a diagram illustrating a display system according to a second embodiment.
Figure 5:
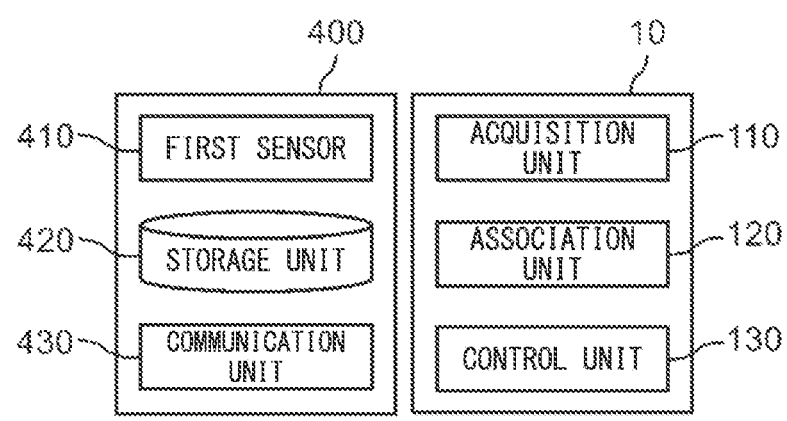

FIG. 5 is a diagram illustrating a display system 30 according to a second embodiment. The display system 30 according to the second embodiment is similar to the display system 30 according to the first embodiment except for the following.

The information processing device 10 further includes a control unit 130. The control unit 130 displays a plurality of objects on the display image 200 in different aspects in accordance with the plurality of electronic writing tools 300.

According to the embodiment, the aspects of the plurality of objects can accurately correspond to the plurality of electronic writing tools 300, respectively. Specifically, in the embodiment, the association unit 120 acquires a correspondence relation between the plurality of electronic writing tools 300 and the positions of the plurality of electronic writing tools 300 on the display image 200, as described in the first embodiment. The control unit 130 can use the correspondence relation to display the plurality of objects on the display image 200 in the different aspects in accordance with the plurality of electronic writing tools 300. Accordingly, the aspects of the plurality of objects can accurately correspond to the plurality of electronic writing tools 300.

The aspect of the object may include, for example, at least one of a line color and a line shape of the object. The shape of the line of the object includes, for example, at least one of the thickness of the line and a kind of line (for example, a solid line, a dashed line, a one-dot chain line, or a double line).

The aspects of the objects may differ in accordance with, for example, identification information attached to the electronic writing tools 300. In this example, different pieces of identification information are attached to the plurality of electronic writing tools 300 in accordance with the plurality of electronic writing tools 300. The identification information may be stored in, for example, the storage unit 330 (see FIG. 2) of the electronic writing tool 300. The identification information may include an aspect of the object (for example, a line color or a line shape of the object) drawn with each electronic writing tool 300. The association unit 120 associates the plurality of pieces of identification information with the positions of the plurality of electronic writing tools 300 on the display image 200, respectively. In this way, the aspects of the plurality of objects can accurately correspond to the plurality of electronic writing tools 300, respectively.

Figure 6:
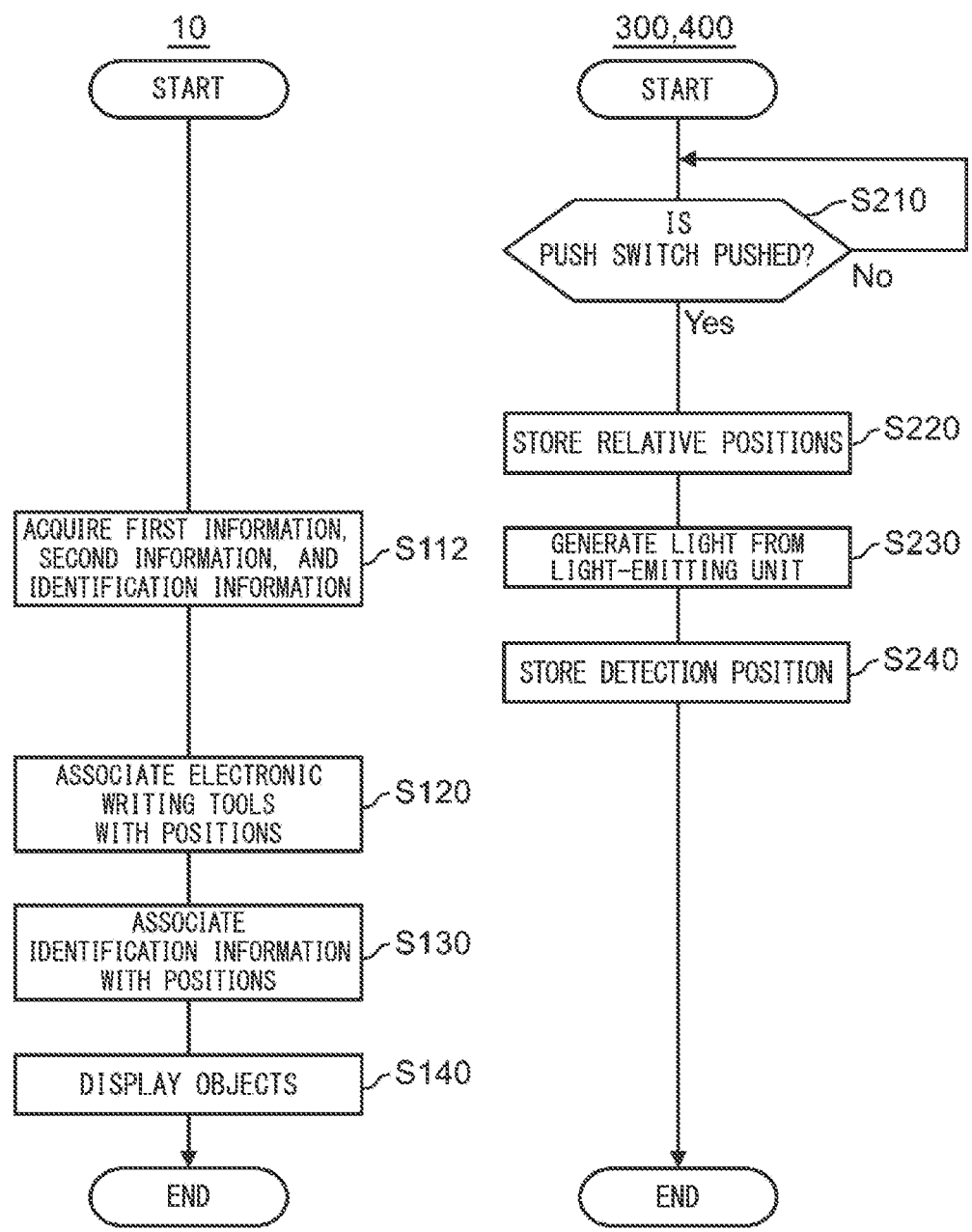
FIG. 6 is a flowchart illustrating an example of an operation of each of the information processing device, the plurality of electronic writing tools, and a sensor device illustrated in FIG. 5.

FIG. 6 is a flowchart illustrating an example of an operation of each of the information processing device 10, the plurality of electronic writing tools 300, and the sensor device 400 illustrated in FIG. 5. The example illustrated in FIG. 6 is similar to the example illustrated in FIG. 4 except for the following.

First, steps S210, S220, S230, and S240 are performed as in the example illustrated in FIG. 4.

The acquisition unit 110 of the information processing device 10 acquires the first information, the second information, and the plurality of pieces of identification information (step S112). The acquisition unit 110 may acquire the first information, the second information, and the plurality of pieces of identification information at different timings or may acquire the first information, the second information, and the plurality of pieces of identification information at the same timing. For example, the acquisition unit 110 may acquire the plurality of pieces of identification information before step S210 is performed or may acquire the plurality of pieces of identification information at the same timing as that of the first information and the second information after steps S210, S220, S230, and S240 are performed.

Subsequently, the association unit 120 of the information processing device 10 associates the plurality of electronic writing tool 300 with the positions of the plurality of electronic writing tool 300 on the display image 200, respectively, using the first information and the second information (step S120).

Subsequently, the association unit 120 of the information processing device 10 associates the plurality of pieces of identification information with the positions of the plurality of electronic writing tool 300 on the display image 200, respectively, using the first information, the second information, and the plurality of pieces of identification information (step S130).

Subsequently, the control unit 130 of the information processing device 10 displays the plurality of objects on the display image 200 in the different aspects in accordance with the plurality of electronic writing tools 300 in accordance with association results of steps S120 and S130 (step S140). In the association of steps S120 and S130, the aspects of the plurality of objects can accurately correspond to the plurality of electronic writing tools 300, respectively.

Third Embodiment

Figure 7:
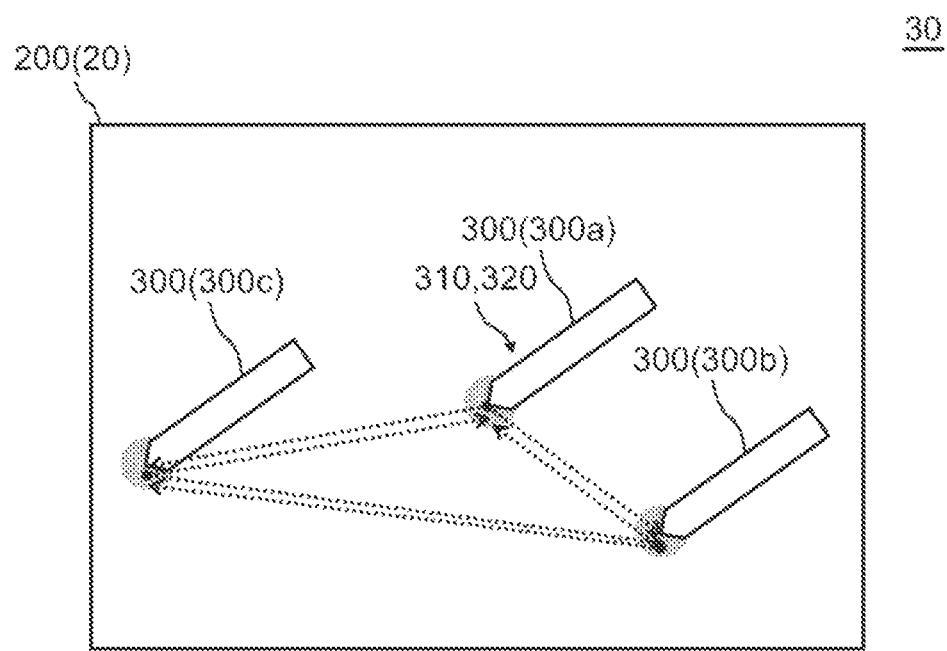
FIG. 7 is a diagram illustrating a display system according to a third embodiment.
Figure 7:
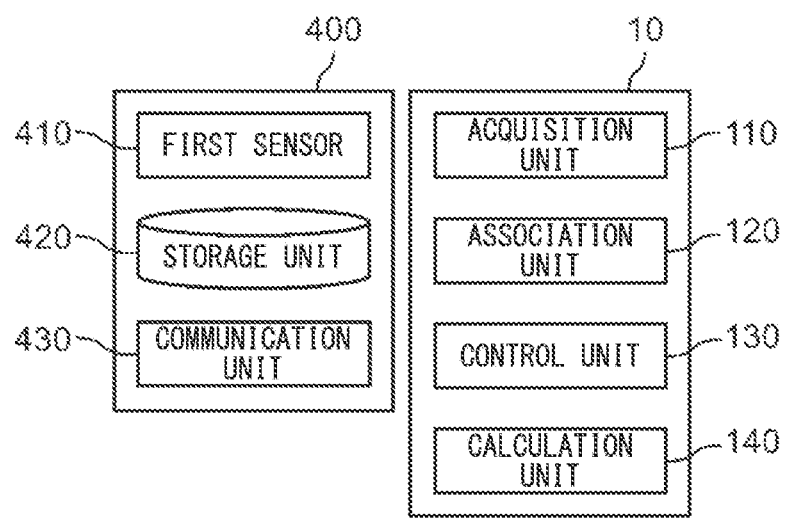
Figure 8A:
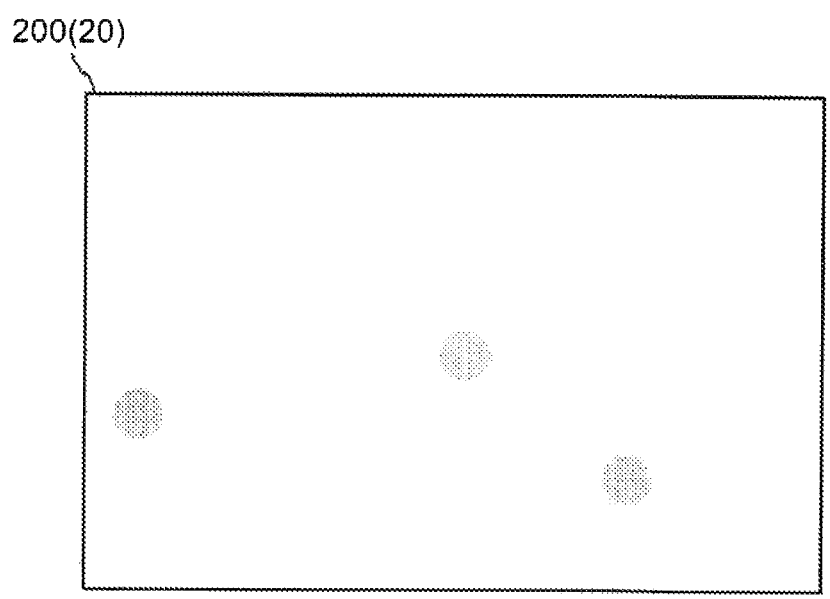
FIG. 8A is a diagram illustrating examples of positions at which a plurality of electronic writing tools are detected on a display image.
Figure 8B:
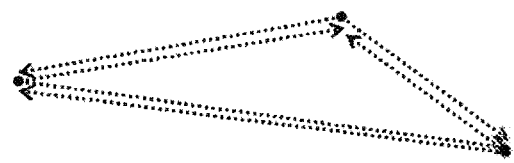
FIG. 8B is a diagram illustrating positions of a plurality of electronic writing tools in positional information calculated by a calculation unit.

FIG. 7 is a diagram illustrating a display system 30 according to a third embodiment. FIG. 8A is a diagram illustrating examples of positions at which the plurality of electronic writing tools 300 are detected on the display image 200. FIG. 8B is a diagram illustrating examples of positions of the plurality of electronic writing tools 300 in positional information calculated by a calculation unit 140. The display system 30 according to the third embodiment is similar to the display system 30 according to the first embodiment except for the following.

The information processing device 10 further includes the calculation unit 140. The calculation unit 140 calculates positional information using the second information (relative positions of the other electronic writing tools 300 relative to each electronic writing tool 300). The positional information includes a position of each of the plurality of electronic writing tools 300. The association unit 120 associates the plurality of electronic writing tool 300 with the positions of the plurality of electronic writing tool 300 on the display image 200, respectively, using the first information and the positional information.

According to the embodiment, the position of each of the plurality of electronic writing tools 300 can be determined using only a detection result of the second sensor 320 of each electronic writing tool 300. Accordingly, even when the first sensor 410 cannot detect some of the plurality of electronic writing tools 300, a detection result (for example, the first information) of the first sensor 410 can be complemented using a detection result (for example, positional information) of the second sensor 320.

The positional information is calculated as follows, for example. First, for example, as illustrated in FIG. 3B, the second sensor 320 of each of the plurality of electronic writing tool 300 detects the relative positions of the other electronic writing tools 300 relative to each electronic writing tool 300. Subsequently, the storage unit 330 of each of the plurality of electronic writing tool 300 shares the relative positions stored in the storage unit 330 of each electronic writing tool 300. Subsequently, for example, as illustrated in FIG. 8B, the calculation unit 140 calculates a position of each of the plurality of electronic writing tool 300 from the relative positions shared by each storage unit 330.

Figure 9:
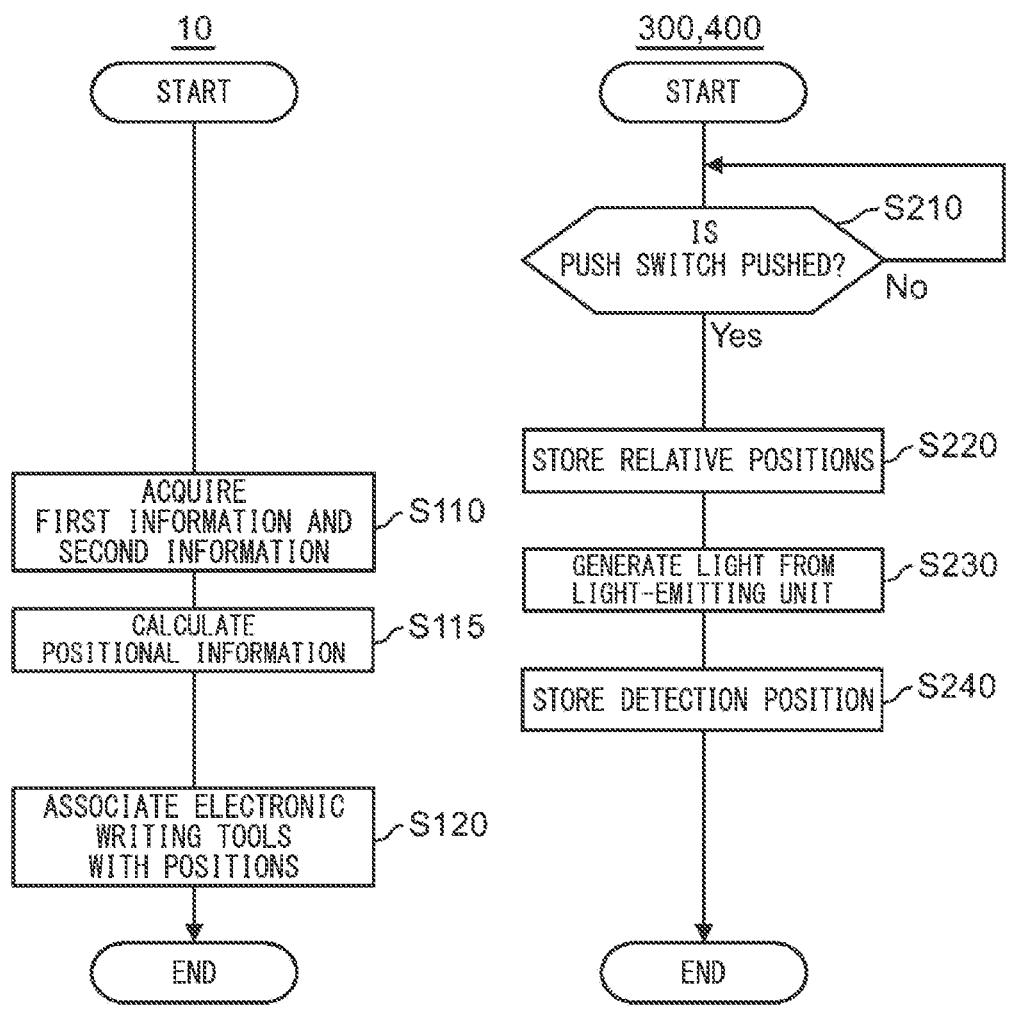
FIG. 9 is a flowchart illustrating an example of an operation of each of the information processing device, the plurality of electronic writing tools, and a sensor device illustrated in FIG. 7.

FIG. 9 is a flowchart illustrating an example of an operation of each of the information processing device 10, the plurality of electronic writing tools 300, and the sensor device 400 illustrated in FIG. 7. The example illustrated in FIG. 9 is similar to the example illustrated in FIG. 4 except for the following.

First, steps S210, S220, S230, and S240 are performed as in the example illustrated in FIG. 4.

The acquisition unit 110 of the information processing device 10 acquires the first information and the second information (step S110) and the calculation unit 140 of the information processing device 10 calculates positional information using the second information (step S115). A timing at which the calculation unit 140 calculates the positional information is not limited to a timing after the acquisition unit 110 acquires the first information and the second information. For example, the calculation unit 140 may calculate the positional information after the acquisition unit 110 acquires the second information and before the acquisition unit 110 acquires the first information.

Subsequently, the association unit 120 of the information processing device 10 associates the plurality of electronic writing tool 300 with the positions of the plurality of electronic writing tools 300 on the display image 200, respectively, using the first information and the positional information (step S120).

Fourth Embodiment

Figure 10:
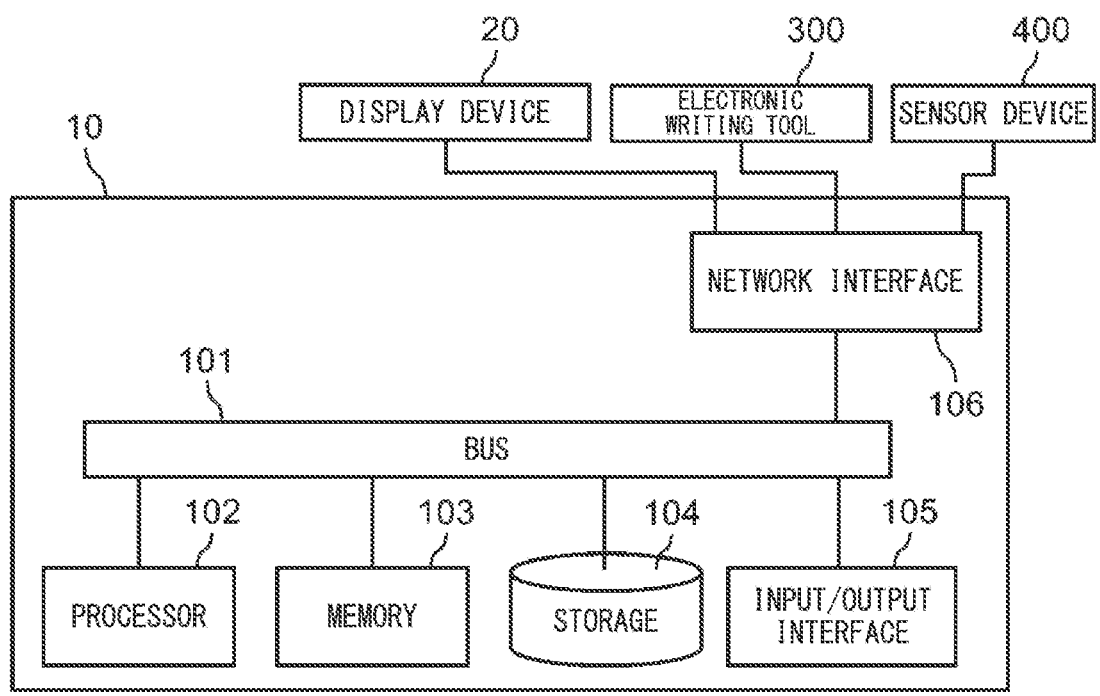
FIG. 10 is a diagram illustrating an example of a hardware configuration of an information processing device according to a fourth embodiment.

FIG. 10 is a diagram illustrating an example of a hardware configuration of the information processing device 10 according to a fourth embodiment.

A main configuration of the information processing device 10 is realized using an integrated circuit. The integrated circuit includes a bus 101, a processor 102, a memory 103, a storage device 104, an input/output interface 105, and a network interface 106.

The bus 101 is a data transmission path along which the processor 102, the memory 103, the storage device 104, the input/output interface 105, and the network interface 106 mutually transmit and receive data. Here, a method of connecting the processor 102 and the like to each other is not limited to bus connection.

The processor 102 is an arithmetic processing device that is realized using a microprocessor or the like.

The memory 103 is a memory realized using a random access memory (RAM) or the like.

The storage device 104 is a storage device realized using a read-only memory (ROM), a flash memory, or the like.

The input/output interface 105 is an interface used to connect the information processing device 10 to a peripheral device.

The network interface 106 is an interface used to connect the information processing device 10 to a communication network. A method of connecting the information processing device 10 to the communication network via the network interface 106 may be wireless connection or wired connection. The information processing device 10 is connected to the display device 20, the electronic writing tool 300 (for example, the communication unit 340 illustrated in FIG. 2), and the sensor device 400 (for example, the communication unit 430 illustrated in FIG. 1) via the network interface 106.

The storage device 104 stores a program module for realizing each functional element of the information processing device 10. The processor 102 reads the program module to the memory 103 and executes the program module to realize each function of the information processing device 10.

The hardware configuration of the foregoing integrated circuit is not limited to the configuration illustrated in FIG. 10. For example, the program module may be stored in the memory 103. In this case, the integrated circuit may not include the storage device 104.

The embodiments of the present invention have been described above with reference to the drawings, but these embodiments are examples of the present invention and other various configurations can also be adopted.

Some or all of the foregoing embodiments can be described as the following supplements, but the present invention is not limited to the following.

In some embodiments, an information processing method includes: acquiring first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool; and associating the plurality of electronic writing tools with positions of the plurality of electronic writing tools on the display image, respectively, using the first information and the second information.

In some cases, identification information is attached to each of the plurality of electronic writing tools. In the respective associating of the plurality of electronic writing tools with the positions of the plurality of electronic writing tools on the display image, the plurality of pieces of identification information are further associated with the positions of the plurality of electronic writing tools on the display image, respectively.

In some cases, the method further includes: calculating positional information including a position of each of the plurality of electronic writing tools using the second information, wherein, in the respective associating of the plurality of electronic writing tools with the positions of the plurality of electronic writing tools on the display image, the plurality of electronic writing tools are associated with the positions of the plurality of electronic writing tools on the display image, respectively, using the first information and the positional information.

In some cases, the first sensor detects light emitted from a light-emitting unit provided in each of the plurality of electronic writing tools.

In some cases, the light emitted from the light-emitting unit is detected from an image including the display image on which the plurality of objects are drawn.

In some cases, the first sensor detects a touch or an approach of each of the plurality of electronic writing tools to the display image.

In some cases, the second sensor includes at least one of an optical sensor and an ultrasonic sensor.

In some cases, for acquiring the first information and the second information, the first information and the second information are acquired when the plurality of electronic writing tools are pushed against the display image.

In some cases, the method further includes: displaying the plurality of objects on the display image in different aspects in accordance with the plurality of electronic writing tools.

In some cases, the aspect of each of the plurality of objects includes at least one of a line color and a line shape of each of the plurality of objects.

In some cases, the display image is an image projected to a projection surface by a projector or an image displayed on a display surface by a display.

In some cases, the plurality of objects are overlapped and displayed on the display image based on a plurality of trajectories along which the plurality of electronic writing tools are traced.

In some cases, for acquiring the first information and the second information, the first information is acquired via one interface and the second information is acquired via another interface different from the one interface.

In some embodiments, a non-transitory computer readable storage medium that stores a computer readable program that cause, when executed by a computer, the computer to: acquire first information which is generated by processing a detection result output from a first sensor provided outside of a plurality of electronic writing tools with which a plurality of objects are drawn on a display image and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool; and associate the plurality of electronic writing tools with positions of the plurality of electronic writing tools on the display image, respectively, using the first information and the second information.

In some cases, identification information is attached to each of the plurality of electronic writing tools, for associating the plurality of electronic writing tools with the positions of the plurality of electronic writing tools on the display image, respectively, and the plurality of pieces of identification information are further associated with the positions of the plurality of electronic writing tools on the display image, respectively.

In some cases, the program further causes the computer to perform calculating positional information including a position of each of the plurality of electronic writing tools using the second information, wherein, for associating the plurality of electronic writing tools with the positions of the plurality of electronic writing tools on the display image, respectively, the plurality of electronic writing tools are associated with the positions of the plurality of electronic writing tools on the display image, respectively, using the first information and the positional information.

In some cases, the first sensor detects light emitted from a light-emitting unit provided in each of the plurality of electronic writing tools.

In some cases, the light emitted from the light-emitting unit is detected from an image including the display image on which the plurality of objects are drawn.

In some cases, the first sensor detects a touch or an approach of each of the plurality of electronic writing tools to the display image.

In some cases, the second sensor includes at least one of an optical sensor and an ultrasonic sensor.

In some cases, for acquiring the first information and the second information, the first information and the second information are acquired when the plurality of electronic writing tools are pushed against the display image.

In some cases, the programs further cause the computer to display the plurality of objects on the display image in different aspects in accordance with the plurality of electronic writing tools.

In some cases, the aspect of each of the plurality of objects includes at least one of a line color and a line shape of each of the plurality of objects.

In some cases, the display image is an image projected to a projection surface by a projector or an image displayed on a display surface by a display.

In some cases, the plurality of objects are overlapped and displayed on the display image based on a plurality of trajectories along which the plurality of electronic writing tools are traced.

In some cases, in the function of acquiring the first information and the second information, the first information is acquired via one interface and the second information is acquired via another interface different from the one interface.

In some embodiments, a display system includes: a display device; a plurality of electronic writing tools used to draw a plurality of objects on a display image displayed by the display device; and an information processing device. The information processing device includes an acquisition unit and an association unit. The acquisition unit is configured to acquire first information which is generated by processing a detection result output from a first sensor provided outside of a plurality of electronic writing tools and includes positions at which the plurality of electronic writing tools are detected on the display image and acquiring second information which is generated by processing a detection result output from a second sensor provided in each of the plurality of electronic writing tools and includes relative positions of the other electronic writing tools relative to each electronic writing tool. The association unit is configured to associate the plurality of electronic writing tools with positions of the plurality of electronic writing tools on the display image, respectively, using the first information and the second information.

In some cases, identification information is attached to each of the plurality of electronic writing tools, and the association unit associates the plurality of pieces of identification information with positions of the plurality of electronic writing tools on the display image, respectively.

In some cases, the system further comprising: a calculation unit for calculating positional information including a position of each of the plurality of electronic writing tools using the second information, wherein the association unit associates the plurality of electronic writing tools with the positions of the plurality of electronic writing tools on the display image using the first information and the positional information.

In some cases, the first sensor detects light emitted from a light-emitting unit provided in each of the plurality of electronic writing tools.

In some cases, the light emitted from the light-emitting unit is detected from an image including the display image on which the plurality of objects are drawn.

In some cases, the first sensor detects a touch or an approach of each of the plurality of electronic writing tools to the display image.

In some cases, the second sensor includes at least one of an optical sensor and an ultrasonic sensor.

In some cases, the acquisition unit acquires the first information and the second information when the plurality of electronic writing tools are pushed against the display image.

In some cases, the system further includes a control unit for displaying the plurality of objects on the display image in different aspects in accordance with the plurality of electronic writing tools.

In some cases, the aspect of each of the plurality of objects includes at least one of a line color and a line shape of each of the plurality of objects.

In some cases, the display image is an image projected to a projection surface by a projector or an image displayed on a display surface by a display.

In some cases, the plurality of objects are overlapped and displayed on the display image based on a plurality of trajectories along which the plurality of electronic writing tools are traced.

In some cases, the acquisition unit acquires the first information via one interface and acquires the second information via another interface different from the one interface.

What is claimed is:

1. An information processing device comprising:
    a memory that stores a program module;
    a hardware processor configured to execute the program module to cause the hardware processor to:
    acquire first information which is generated by processing a detection result output from a first sensor provided outside of a plurality of electronic writing tools with which a plurality of objects are drawn on a display image wherein the first information includes a plurality of respectively detected positions at which the plurality of electronic writing tools are detected on the display image respectively;
    acquire second information which is generated by processing a respective detection result output from each second sensor of a plurality of second sensors respectively provided in the plurality of electronic writing tools the second information includes a respective set of relative positions of the other electronic writing tools relative to each electronic writing tool of the plurality of electronic writing tool; and
    associate the plurality of electronic writing tools with the plurality of respectively detected positions of the plurality of electronic writing tools on the display image, respectively, based at least on the plurality of respectively detected positions and the respective sets of relative positions of the other electronic writing tools relative to each electronic writing tool of the plurality of electronic writing tools.

2. The information processing device according to claim 1, wherein the hardware processor is configured to execute the program module to cause the hardware processor to further:
    allocate a respective identification information to each of the plurality of electronic writing tools, and
    associate the plurality of pieces of identification information with the plurality of respectively detected positions of the plurality of electronic writing tools on the display image, respectively.

3. The information processing device according to claim 1, wherein the first sensor is configured to detect light emitted from a light-emitting unit provided in each of the plurality of electronic writing tools.

4. The information processing device according to claim 3, wherein the light emitted from the light-emitting unit is detected from an image including the display image on which the plurality of objects are drawn.

5. The information processing device according to claim 1, wherein the first sensor is configured to detect a touch or an approach of each of the plurality of electronic writing tools to the display image.

6. The information processing device according to claim 1, wherein each second sensor of the plurality of second sensors includes at least one of an optical sensor and an ultrasonic sensor.

7. The information processing device according to claim 1, wherein the hardware processor is configured to execute the program module to cause the hardware processor to further acquire the first information and the second information when the plurality of electronic writing tools are pushed against the display image.

8. The information processing device according to claim 1, further comprising:
    a control unit configured to display the plurality of objects on the display image in different aspects in accordance with the plurality of electronic writing tools.

9. The information processing device according to claim 8, wherein the aspect of each of the plurality of objects includes at least one of a line color and a line shape of each of the plurality of objects.

10. The information processing device according to claim 1, wherein the display image is an image projected to a projection surface by a projector or an image displayed on a display surface by a display.

11. The information processing device according to claim 1, wherein the plurality of objects are overlapped and displayed on the display image based on a plurality of trajectories along which the plurality of electronic writing tools are traced.

12. The information processing device according to claim 1, wherein the hardware processor is configured to execute the program module to cause the hardware processor to further acquires the first information via one interface and acquires the second information via another interface different from the one interface.

13. An information processing method comprising:
    acquiring first information which is generated by processing a detection result output from a first sensor provided outside of a plurality of electronic writing tools with which a plurality of objects are drawn on a display image and includes a plurality of respectively detected positions at which the plurality of electronic writing tools are detected on the display image respectively;
    acquiring second information which is generated by processing a respective detection result output from each second sensor of a plurality of second sensors respectively provided in the plurality of electronic writing tools the second information includes a respective set of relative positions of the other electronic writing tools relative to each electronic writing tool of the plurality of electronic writing tool; and
    associating the plurality of electronic writing tools with the plurality of respectively detected positions of the plurality of electronic writing tools on the display image, respectively, based at least on the plurality of respectively detected positions and the respective sets of relative positions of the other electronic writing tools relative to each electronic writing tool of the plurality of electronic writing tools.

14. A system comprising:
a plurality of electronic writing tools, each of the plurality of electronic writing tools being configured to write a respective object on a display image;
a first sensor provided outside of the plurality of electronic writing tools, the first sensor being configured to detect a plurality of respective positions of the plurality of electronic writing tools on the display image; and
an information processing device provided outside the plurality of electronic writing tools, and provided outside the first sensor, wherein each of the plurality of electronic writing tools further comprises:
a second sensor configured to detect a respective set of relative positions to other electronic writing tools of the plurality of electronic writing tool, the relative positions are relative to the electronic writing tools in the writing of the object on the display image, and
wherein the information processing device comprising:
a memory that stores a program module;
a hardware processor configured to execute the program module to cause the hardware processor to:
acquire first information which is generated by processing a detection result output from the first sensor, wherein the first information includes a plurality of respectively detected positions at which the plurality of electronic writing tools are detected on the display image respectively;
acquire second information which is generated by processing respective detection results output from the plurality of second sensors provided respectively in the plurality of electronic writing tools, wherein the second information includes respective sets of relative positions of the other electronic writing tools relative to the plurality of electronic writing tools; and
associate the plurality of electronic writing tools with the plurality of respectively detected positions of the plurality of electronic writing tools on the display image, respectively, based at least on the plurality of respectively detected positions and the respective sets of relative positions of the other electronic writing tools relative to each electronic writing tool of the plurality of electronic writing tools.

15. The system according to claim 14, wherein each of the plurality of electronic writing tools comprises:
a supporter having a tip end and a rear end;
a light-emitting unit located at the tip end, the light-emitting unit being configured to emit light in writing of an object on a display image; and
the second sensor is located at the tip end and next to the light-emitting unit.

16. A system comprising:
a plurality of electronic writing tools, each of the plurality of electronic writing tools being configured to write a respective object on a display image;
wherein each of the plurality of electronic writing tools comprises;
a supporter having a tip end and a rear end;
a light-emitting unit located at the tip end, the light-emitting unit being configured to emit light in writing of an object on a display image; and
a sensor located at the tip end, the sensor and next to the light-emitting unit, the sensor being configured to detect a respective set of relative positions to other electronic writing tools of the plurality of electronic writing tool, the relative positions are relative to the electronic writing tools in the writing of the object on the display image.

* * * * *